(12) United States Patent
Mariani

(10) Patent No.: US 7,481,864 B2
(45) Date of Patent: Jan. 27, 2009

(54) CONVERSION OF $TA_2O_5$ TO TA METAL

(75) Inventor: Robert Mariani, Douglassville, PA (US)

(73) Assignee: Cabot Corporation, Boston, MA (US)

( * ) Notice: Subject to any disclaimer, the term of this patent is extended or adjusted under 35 U.S.C. 154(b) by 574 days.

(21) Appl. No.: 11/036,654

(22) Filed: Jan. 14, 2005

(65) Prior Publication Data

US 2005/0150328 A1    Jul. 14, 2005

Related U.S. Application Data

(60) Provisional application No. 60/536,296, filed on Jan. 14, 2004.

(51) Int. Cl.
*B22F 9/20*    (2006.01)
(52) U.S. Cl. ...................................................... 75/369
(58) Field of Classification Search .................. 75/353, 75/366, 367, 369, 622
See application file for complete search history.

(56) References Cited

U.S. PATENT DOCUMENTS

| | | | | |
|---|---|---|---|---|
| 2,861,791 | A * | 11/1958 | Chisholm et al. | 266/183 |
| 3,230,077 | A * | 1/1966 | Hiller | 422/4 |
| 3,252,823 | A * | 5/1966 | Jacobson et al. | 427/213 |
| 3,519,258 | A * | 7/1970 | Ishizuka | 266/171 |
| 4,518,426 | A * | 5/1985 | Murphy | 75/619 |
| 6,171,363 | B1 | 1/2001 | Shekhter et al. | 75/369 |
| 6,323,055 | B1 | 11/2001 | Rosenberg et al. | 438/77 |
| 6,348,113 | B1 | 2/2002 | Michaluk et al. | 148/668 |
| 6,373,685 | B1 * | 4/2002 | Kimmel et al. | 361/508 |
| 6,558,447 | B1 | 5/2003 | Shekhter et al. | 75/252 |
| 6,566,161 | B1 | 5/2003 | Rosenberg et al. | |
| 6,833,058 | B1 | 12/2004 | Turner et al. | |
| 6,955,703 | B2 * | 10/2005 | Zhou et al. | 75/351 |
| 2002/0132388 | A1 | 9/2002 | Rosenberg et al. | |
| 2004/0216558 | A1 | 11/2004 | Mariani | 75/245 |

FOREIGN PATENT DOCUMENTS

| | | |
|---|---|---|
| DE | 0 440 936 A2 | 12/1990 |
| JP | 58-110828 | 7/1983 |
| JP | HEI 3(1991)-197640 | 8/1991 |
| JP | 04-218608 | 8/1992 |

OTHER PUBLICATIONS

Adelman, "Surfactant Aided Dispersion of Nanoparticular Suspension of Welding Fume." (no date).
West, "Solid State Chemistry and Its Applications," Wiley, New York, pp. 655-656 (1984).
German, "Sintering Theory and Practice," Wiley, New York, pp. 73-89 (1996).
Rolsten, "Iodide Metals and Metal Iodides," Wiley, New York, pp. 110-119 (1961).
International Search Report for PCT/US2005/001408 dated Jun. 14, 2005, three pages.

* cited by examiner

*Primary Examiner*—Roy King
*Assistant Examiner*—Ngoclan T Mai

(57) ABSTRACT

Processes for producing valve metal are described, in which valve metal oxide is converted to valve metal using a vapor-phase transport agent to form a gaseous valve metal species in the presence of a solid getter material. Also described is the valve metal so produced, and anodes prepared from the valve metal, as well as electrolytic capacitors using the anodes.

22 Claims, 2 Drawing Sheets

CONVERSION OF $Ta_2O_5$ TO TA METAL

This application claims priority under 35 U.S.C. §119(e) of prior U.S. Provisional Patent Application No. 60/536,296 filed Jan. 14, 2004, which is incorporated in its entirety by reference herein.

BACKGROUND OF THE INVENTION

The present invention relates to valve metals and electrolytic capacitors using the valve metals, and methods of making the valve metals and the capacitors. More particularly, the present invention relates to processes for converting valve metal oxide to valve metal, and articles such as capacitors made from the valve metal.

Valve metals, e.g., tantalum and niobium, are generally extracted from ores and formed into powders. Tantalum powders, for example, which are suitable for use in high performance capacitors, can be produced by chemical reduction, such as the sodium reduction of potassium fluorotantalate. In conventional processes, the potassium fluorotantalate is recovered from processed ore in the form of a dry crystalline powder. The potassium fluorotantalate is dissolved in a molten salt bath and reduced to tantalum metal powder by sodium reduction. The tantalum powder formed is then washed and acid leached, as described, for example, in U.S. Pat. Nos. 6,312,642, and 5,993,513, which are incorporated in their entireties herein by reference. The tantalum is then dried, producing what is known as a basic lot powder.

The basic lot powder can include various contaminants, including oxygen, that are undesirable and/or should be removed by further processing of the basic lot powder to produce capacitor-grade valve metal powder. Oxidation of valve metal powder can occur at various stages in the production or processing of the valve metal material made by various active or passive processes. For example, the valve metal can gain an oxide layer due to surface reaction with air under ambient or other conditions. Accordingly, the basic lot powder is typically subjected to one or more decontaminating techniques, such as deoxidizing, to produce a capacitor grade metal powder.

Accordingly, a need exists for processes for producing capacitor-grade valve metal having high purity which are less time consuming and less resource-intensive than conventional methods for producing a valve metal.

SUMMARY OF THE PRESENT INVENTION

It is therefore a feature of the present invention to provide a process for converting a valve metal oxide to a valve metal.

Another feature of the present invention is to provide a process for reducing a valve metal oxide in which the valve metal oxide is not blended with the reducing agent, and preferably, does not directly contact the reducing agent.

A further feature of the present invention is to provide a process for preparing valve metal in which the reducing agent is a solid getter material.

Yet another feature of the present invention is to provide a process for preparing valve metal in which the valve metal can be isolated from the getter material during the formation of the valve metal, thereby obviating the further step of separating the valve metal from the getter material.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a process for producing valve metal that involves contacting, in a reactor, at least one solid valve metal oxide and at least one vapor-phase transport agent to form at least one gaseous valve metal species, and contacting the gaseous valve metal species with at least one solid getter material to form the valve metal.

The present invention further relates to capacitor-grade valve metals, particularly powders, sintered bodies, such as anodes prepared from the capacitor-grade valve metal powders, and high performance electrolytic capacitors using the anodes.

The present invention also relates to thin films of valve metal and other morphologies of valve metal formed in the process of converting valve metal oxide to a valve metal.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

Figure 1:
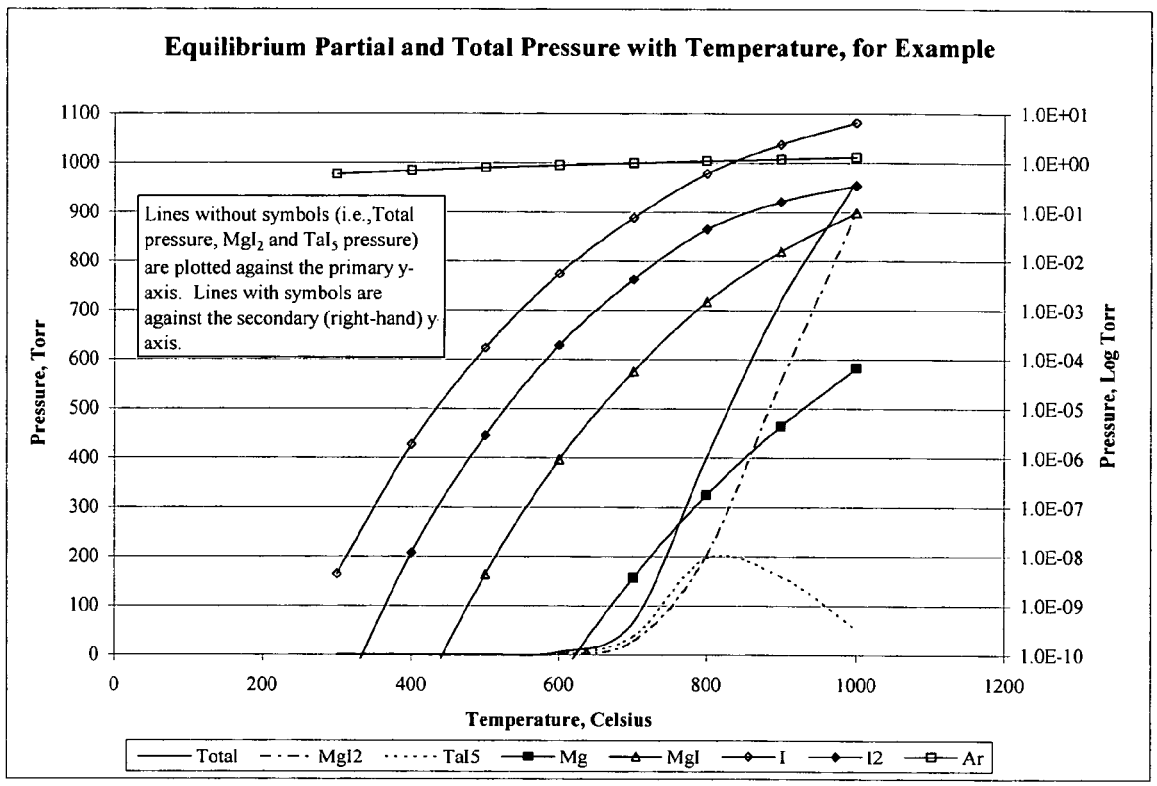
FIG. 1 is a graph of the respective amounts of gas present in the reactor as a function of heating temperature in an exemplary process according to the present invention.

A method according to the present invention for producing valve metal generally includes converting a valve metal oxide to a valve metal. The process includes contacting, in a reactor, a solid valve metal oxide and a vapor-phase transport agent to form a gaseous valve metal species, and contacting the gaseous valve metal species and a solid getter material to form the valve metal.

For purposes of the present invention, examples of the solid valve metal oxide or starting valve metal oxide can be, but are not limited to, at least one oxide of the metals in Groups IV, V, and VI (IUPAC designations) of the Periodic Table of the Elements, aluminum, bismuth, antimony, and alloys thereof as well as combinations thereof. Preferably, the starting valve metal oxide is an oxide of tantalum, aluminum, titanium, zirconium, niobium, and/or alloys thereof, and most preferably is a tantalum oxide or niobium oxide, or alloys thereof. Generally, the alloys of the valve metal oxide can have the valve metal as the predominant metal present in the alloy oxide. Specific examples of the starting valve metal oxide can be a valve metal suboxide, such as TaO or NbO. Preferably, the starting valve metal oxide is tantalum pentoxide ($Ta_2O_5$) or niobium pentoxide ($Nb_2O_5$).

The starting valve metal oxide in the present invention can be any shape or size. The starting valve metal oxide can be pure valve metal oxide, for example, having a purity of from about 99% to about 99.99% or more. The starting valve metal oxide can also be a valve metal oxide layer on a valve metal having any form. In other words, the starting valve metal oxide can be provided in or on a valve metal having an oxygen content, for example, of from about 10 to about 10,000 ppm. The valve metal oxide layer can be passively or actively formed on the valve metal by any process. The valve metal oxide layer can be a substantially continuous layer or a non-uniform or dispersed layer. The valve metal oxide layer can be located on the surface of the valve metal or diffused within the valve metal.

The starting valve metal oxide is preferably in the form of a solid, for instance, a powder or a plurality of particles. Examples of the type of powder that can be used include, but are not limited to, flaked, angular, spherical, fibrous, nodular, or mixtures or variations thereof. The powder can include primary particles, agglomerated primary particles, or a combination thereof. Examples of such preferred valve metal oxide powders include those having mesh sizes of from about 60/100 to about 100/325 and from about 60/100 to about 200/325 mesh. Another range of size is from about −40 mesh to about −325 mesh. Preferably, the powders have a primary particle size ($D_{50}$) of from about 0.25 to about 5 μm, and/or a BET surface area of from about 1 to about 8 $m^2/g$. The powders preferably include excellent flow properties, such as from about 100 to about 500 mg/s or more, and more preferably, at least about 200 mg/s as measured by ASTM B 213 using a 3 mm diameter orifice.

The valve metal oxide can contain any number of modifying agents or additives or dopants, including, but not limited to, nitrogen, silicon, phosphorous, boron, carbon, sulfur, yttrium or combinations thereof. The valve metal oxide can be nitrated and/or contain a nitride layer. Furthermore, with respect to the numerous beneficial properties described above, such as the $D_{50}$, BET surface area, flow properties, oxygen contents, electrical properties, and the like, it is important to appreciate that for purposes of the present invention, the starting valve metal oxide can have at least one of these characteristics, or two or more of these characteristics, or all of these characteristics. Any combination of properties and characteristics is possible.

The process of the present invention can occur in any container or reactor used in the processing of metals, such as niobium and tantalum. For instance, the process can be conducted in any treatment device or reaction system such as a retort, crucible, vacuum chamber, vacuum furnace, or a vacuum kiln, as described, for example, in U.S. Pat. Nos. 6,380,517 B2; 6,271,501 B1; and 6,105,272, each of which is incorporated in its entirety herein by reference. Preferably, the reactor is sealable. According to one embodiment, the reactor is a vacuum furnace that includes an isolatable trap. The isolatable trap can include, for example, an inlet(s) and an outlet(s) and inlet and outlet valves. Preferably, the temperature of the isolatable trap can be made to be the same as or different from that of the vacuum furnace.

The oxygen-active or getter material for purposes of the present invention is any material capable of displacing oxygen from the starting valve metal oxide, i.e., an oxygen getter. Preferably, the getter material has an initial oxygen concentration that is lower than that of the starting valve metal oxide. The getter material can be a solid having any shape or size. The getter material can be in the form that can react with other materials, and more preferably, with iodine to form an iodide compound. Accordingly, the getter material can be, but is not limited to, tantalum, niobium, metal oxides, magnesium, aluminum, sodium, potassium, combinations and alloy of the same, and the like, and is preferably magnesium. The getter material can contain other getter materials and/or other constituents.

The getter material can be in the form of a powder or a plurality of particles, for example. Examples of the type of powder that can be used include, but are not limited to, flaked, angular, spherical, fibrous, nodular, fine or coarse chips, and mixtures or variations thereof. The getter material can be in the form of a tray, for instance. According to one embodiment, the getter material can be disposed on a substrate, e.g., coupon, filamentary, porous, and the like, such that the valve metal can assume the morphology of the substrate. For example, the getter material can be present as a film on a substrate such that formation of the valve metal by the process of the present invention produces valve metal on the substrate. Thus, a thin valve metal film, for example, can be provided on a substrate by practicing the process of the present invention. According to one embodiment of the present invention, the valve metal and the starting valve metal oxide have dissimilar morphologies. In other words, the shape, form, or other physical property of the starting valve metal oxide can be changed during the process of the present invention, for instance, from a powder to a film as the final product. Preferably, the morphology of the valve metal can be controlled by controlling one or more of the operating parameters of the present invention, for instance, temperature of the reactor, pressure of the reactor, and/or form of the getter.

The process of the present invention can include placing the starting valve metal oxide and the getter material in the reactor. The starting valve metal oxide and the getter material can be disposed in one container within the reactor. Preferably, the starting valve metal oxide and the getter material are disposed in two or more separate containers. Any type of container can be used for containing the starting valve metal oxide or the getter material. The container can be of any shape and/or size. The reactor can be at ambient temperature and/or pressure during the process of the present invention. The reactor can be under vacuum or pressurized. The reactor can be heated as described in detail below.

Generally, a sufficient amount of getter material is initially present in the reactor to effect the conversion of the starting valve metal oxide to valve metal. The initial amount of getter material and starting valve metal oxide can relate to the type, form, and the like of the getter material, the type, form, and the like of the starting valve metal oxide, the operating conditions within the reactor, and its size, material, type, form and the like. Getter material and/or starting valve metal oxide can be added at any point during the process of the present invention. According to one embodiment; the solid getter material is present in the reactor in an amount that is less than or equal to a stoichiometric amount of the starting valve metal oxide present in the reactor. Preferably, the solid getter material is present in the reactor in an initial amount that is less than or equal to an initial stoichiometric amount of the starting valve metal oxide present in the reactor. Preferably, during the process of the present invention, the amount of solid getter material present in the reactor is maintained less than or equal to a stoichiometric amount of the starting valve metal oxide present in the reactor.

Contacting the starting valve metal oxide and the vapor-phase transport agent according to the present invention can include placing the starting valve metal oxide and the vapor-phase transport agent in the presence of one another. Contacting can be achieved by disposing the vapor-phase transport agent in the reactor along with the starting valve metal oxide and the getter material. The vapor-phase transport agent can be added to the reactor at any point in the process of the present invention. According to one embodiment, the vapor-phase transport agent can be generated or created in situ within the reactor. According to one embodiment of the present invention, contacting the starting valve metal oxide and the vapor-phase transport agent can include reacting the starting valve metal oxide and the vapor-phase transport agent. Contacting the starting valve metal oxide and the vapor-phase transport agent can be for any time sufficient to form the valve metal of the present invention, for example, from about 1 minute to about 36 hours, and preferably from about 10 minutes to about 30 hours, and more preferably from about 30 minutes to about 10 hours. Contacting the starting valve metal oxide and the vapor-phase transport agent preferably forms a gaseous valve metal species.

According to one embodiment of the present invention, contacting the starting valve metal oxide and the getter material is in the presence of a halogen source in the reactor. The halogen source can be disposed in the reactor in any amount, for example, from a trace amount up to any amount. Preferably, the halogen source is present in the reactor in an amount by weight that is less than the amount of the starting valve metal oxide.

The total pressure in the reactor is preferably controlled by controlling the temperature, the size of the reactor, the amount of the halogen source present in the reactor, and the initial pressure when the reactor is sealed. The sum of partial pressures for the halogen source and the vapor-phase transport agents derived from the halogen source is preferably controlled by controlling the temperature of the reactor and the amount of the halogen source present in the reactor. Other inert gas components, for example, argon may exert a greater or lesser partial pressure than the sum of partial pressures for halogen source and vapor-phase transport agents. The partial pressure for other inert gas components is preferably controlled by controlling the temperature and the pressure of the other inert gas phase components when the reactor is sealed.

The halogen source can be any source suitable for forming a valve metal-halogen and/or a getter material-halogen compound. For example, the halogen source can be elemental iodine, iodine in the solid, liquid, and/or gas phase, or an iodine compound, as well as bromine, chlorine, fluorine, and the like. The halogen source can react with the starting valve metal oxide to form a valve metal-halogen compound and/or with the getter material to form a getter material-halogen compound that acts as a vapor-phase transport agent. Accordingly, the vapor-phase transport agent can be, for example, a halide and/or a sub-halide. In other words, the vapor-phase transport agent can be, for instance, $TaX_y$, $NbX_y$, $MgX_y$, and the like, where X is a halogen and y is an integer, e.g., 1, 2, 3, etc., or a non-integer, e.g., 0.1, 1.1, 2.5, etc. The vapor-phase transport agent of the present invention can be a halogen, such as iodine. In addition, the vapor-phase transport agent of the present invention can be a halide that includes a portion of the getter material. According to one embodiment, the vapor-phase transport agent can include $I_2$, $MgI_2$, $AlI_3$, $TaI_5$, $NbI_5$, or a combination thereof. The vapor-phase transport agent can be created in situ within the reactor and during the process of the present invention, by reacting the halogen present in the reactor with the starting valve metal oxide and/or the getter material. Preferably, contacting the starting valve metal oxide and the vapor-phase transport agent forms a gaseous valve metal species.

The gaseous valve metal species can be a valve metal-halogen compound. Examples of the gaseous valve metal species include $TaI_5$ and $NbI_5$. Other gaseous valve metal species are possible.

Contacting the gaseous valve metal species and the getter material can include having the presence of both in the reactor. Contacting the gaseous valve metal species and the getter material can include reacting one with the other. Contacting the gaseous valve metal species and the getter material preferably reduces the gaseous valve metal species to valve metal, wherein the reducing agent is the solid getter material. Contacting the gaseous valve metal species and the getter material can be for any time sufficient to form the valve metal of the present invention, for example, from about 1 minute to about 36 hours, and preferably from about 10 minutes to about 10 hours.

The valve metal of the present invention can be any valve metal, such as tantalum or niobium, as well as alloys thereof. The valve metal formed from the process of the present invention can have any shape, size, physical form, purity, and the like. According to one embodiment, the valve metal has an oxygen content of about 10,000 ppm or less. Preferably, the valve metal has an oxygen content of about 5000 ppm or less, or an oxygen content of about 2,000 ppm or less (e.g., from about 50 ppm to about 10,000 or from about 100 ppm to about 5,000 ppm). Other oxygen contents are possible. Preferably, the valve metal has a higher purity than that of the starting valve metal oxide. Accordingly, the process of the present invention can be a purification process in addition to a conversion process. The present invention also relates to the valve metal made according to the process of the present invention. The valve metal can be subject to further processing such as deoxidizing, classifying, sintering, and the like.

An exemplary cyclic reaction sequence can be represented as:

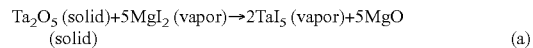

(a)

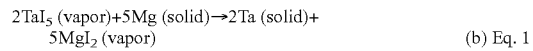

(b) Eq. 1

In (a), $Ta_2O_5$ is the starting valve metal oxide, $MgI_2$ is introduced as the vapor-phase transport agent, $TaI_5$ is the gaseous valve metal species, and MgO is a by-product. $MgI_2$ is consumed in the conversion process of stage (a). Once some $TaI_5$ is produced in stage (a), it participates in the cycle as one of the vapor phase transport agents. In (b), the $TaI_5$ vapor contacts solid magnesium, which produces the valve metal while regenerating the $MgI_2$ vapor. A portion of the $MgI_2$ and/or $TaI_5$ can optionally be collected, e.g., in the optional isolatable trap, for re-use, for instance, as the vapor-transport agent in a subsequent process of the present invention. According to one embodiment, the MgO by-product is kept separate and eventually discarded. Reactions similar to that illustrated in Eq. 1 can occur. For example, other valve metal oxides, getter materials, and/or halides can be used in forming the vapor-phase transport agent, the gaseous valve metal species, and/or the final valve metal product.

Accordingly, in one embodiment, the starting valve metal oxide includes tantalum pentoxide, the vapor-phase transport agent includes $I_2$, $TaI_5$, $MgI_2$, or a combination thereof, the gaseous valve metal species includes $TaI_5$, the solid getter material includes magnesium, and the valve metal includes tantalum. In another embodiment, the starting valve metal oxide includes niobium pentoxide, the vapor-phase transport agent includes $I_2$, $MgI_2$, $AlI_3$, $NbI_5$, or a combination thereof, the gaseous valve metal species includes $NbI_5$, the solid getter material includes magnesium, and the valve metal includes niobium. For example, the getter and vapor-phase transport agent, for the conversion of $Nb_2O_5$ to Nb, may be aluminum and $AlI_3$, respectively. In addition, contacting the starting valve metal oxide and the vapor-phase transport agent can further form a getter material oxide, for instance, by-product MgO. According to one embodiment with $Ta_2O_5$ and magnesium, the starting valve metal oxide and the solid getter material are preferably present in the reactor in a weight ratio range of from about 1:0.2 to about 1:2.75. The vapor-phase transport agents are preferably present in amounts that exert a sum of partial pressures between $1.0\times10^{-5}$ torr and 1500 torr at the highest reaction temperatures.

The process of the present invention optionally includes heat treating the starting valve metal oxide and the vapor-phase transport agent in the reactor. The heat treatment preferably promotes a reaction between the starting valve metal oxide and the vapor-phase transport agent. Preferably, heat treating is at a temperature of less than about 1200° C., for example, from about 100 to about 1000° C., and preferably from about 300 to about 900° C. During the process of the present invention in one embodiment, preferably, the reactor is at a temperature that does not exceed the melting point of the getter material. Heat treating can be for any time sufficient to form the valve metal of the present invention, for example, from about 1 minute to about 36 hours, and preferably from about 10 minutes to about 10 hours.

The process of the present invention can be conducted under vacuum. Preferably, an initial pressure of the reactor is from about $1\times10^{-7}$ to about 100 torr. An atmosphere within the reactor can contain an inert gas, e.g., argon. The temperature and pressure can be constant throughout the process, or one or both can be varied or controlled as desired throughout the process. Preferably, a pressure of the reactor contains substantially no partial pressure of the getter material. In other words, the presence of getter material in the vapor phase in the reactor in the vicinity of the valve metal oxide is preferably negligible. For purposes of the present invention, substantially no partial pressure can mean a partial vapor pressure in the reactor of about 3 orders of magnitude less than a partial vapor pressure for the vapor-phase transport agents and/or the gaseous valve metal species. Substantially no partial pressure can also mean a partial vapor pressure in the reactor of about 4, 5, 6, 7, 8, 9, 10, 11, 12, 13, 14, or 15 orders of magnitude less than a partial vapor pressure in the reactor for the vapor-phase transport agent and/or the gaseous valve metal species. For purposes of the present invention, the effects of the presence of the getter material in the vapor phase can be ignored. Preferably, the process of the present invention does not involve the vapor phase of the getter material. In other words, the vapor phase of the getter material does not substantially act as the reducing agent. Accordingly, the present invention further relates to a process for producing valve metal which essentially avoids the use of a gaseous oxygen getter, e.g., magnesium vapor, as a reducing agent.

Figure 2:
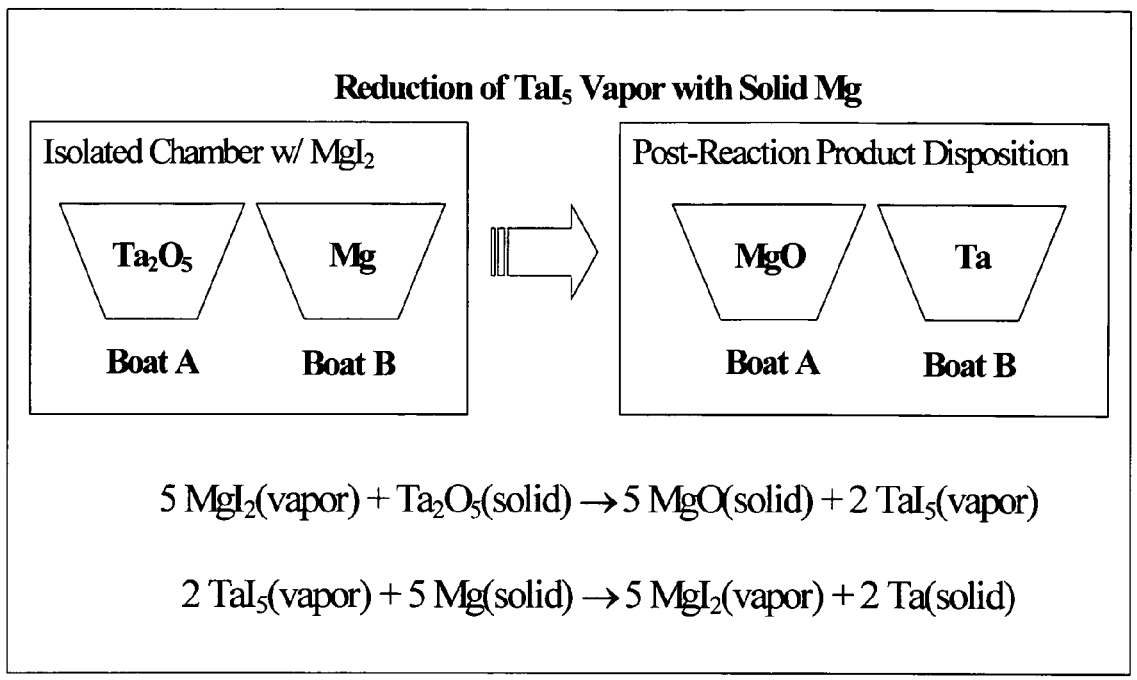
FIG. 2 is a schematic drawing illustrating how the starting materials and reaction products can be kept separated in an exemplary process according to the present invention.

The process of the present invention can include isolating the valve metal from the getter material and/or the getter material oxide by-product after the formation of the valve metal. In the example of FIG. 2, the disposition of the starting materials and products shows that the valve metal oxide does not need to contact the reducing agent in any form (i.e., vapor, liquid, or solid) in order for the reaction to proceed. The process of the present invention can include separating the valve metal from the getter material and/or the getter material oxide by-product after the formation of the valve metal if the same are mixed during the process of the present application.

The various valve metals of the present invention can be further characterized by the electrical properties resulting from the formation of a capacitor anode using the valve metal of the present invention. In general, the valve metal of the present invention can be further processed and tested for electrical properties by pressing powders of the valve metal into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the valve metal of the present invention. The capacitor of the present invention can be formed by any method, for example, as described in U.S. Pat. Nos. 6,576,099 B2; 6,576,038 B1; 6,563,695 B1; 6,562,097 B1; 6,527,937 B2; 6,479,012 B1; 6,462,934 B2; 6,420,043 B1; 6,416,730 B1, 6,375,704 B1; 6,373,685 B1, 6,338,816 B1; 6,322,912 B1; 6,165,623; 6,051,044; 5,986, 877, 5,580,367; 5,448,447; 5,412,533; 5,306,462; 5,245,514; 5,217,526; 5,211,741; 4,805,704; and 4,940,490, and Published U.S. Patent Application Nos. 2003/0115985 A1; 2003/ 0026756 A1; 2003/0003044 A1; 2002/0179753 A1; 2002/ 0152842 A1; 2002/0135973 A1; 2002/0124687 A1; 2002/ 0104404 A1; 2002/0088507 A1; 2002/0072475 A1; 2002/ 0069724 A1; 2002/0050185 A1; 2002/0028175 A1; and 2001/0048582 A1, each of which is incorporated herein in its entirety by reference.

The capacitors of the present invention can be used in a variety of end uses such as automotive electronics, cellular phones, computers, such as monitors, mother boards, and the like, consumer electronics including TVs and CRTs, printers/ copiers, power supplies, modems, computer notebooks, disc drives, and the like. Anodes can be made from the valve metal in a similar process as used for fabricating metal anodes, i.e., pressing porous pellets with embedded lead wires or other connectors followed by optional sintering and anodizing. The lead connector can be embedded or attached at any time before anodizing. Anodes made from some of the valve metal of the present invention can have a capacitance of from about 1,000 CV/g or lower to about 200,000 CV/g or more, and other ranges of capacitance can be from about 20,000 to about 200,000 CV/g or from about 62,000 to about 200,000 CV/g, and preferably from about 40,000 to about 200,000 CV/g. In forming the capacitor anodes of the present invention, a sintering temperature can be used that permits the formation of a capacitor anode having the desired properties. The sintering temperature can be based on the particular valve metal used.

The anodes formed from the valve metal of the present invention are preferably formed at a voltage (Vf) of about 30 volts, and preferably from about 6 volts to about 80 volts or more. The valve metal provides excellent low DC leakage at high formation voltages. Also, the anodes formed from the valve metal of the present invention preferably include a DC leakage of less than about 5 nA/CV, for example, from about 5 nA/CV to about 0.10 nA/CV.

As an example, thermodynamics have been assessed for the system involving $Ta_2O_5$, aluminum, and $AlI_3$ to produce tantalum metal. The $Ta_2O_5$ and aluminum would be placed in separate containers inside a sealed reactor. The $AlI_3$ would be placed inside the sealed container. The process would continue reacting $Ta_2O_5$ with $AlI_3$ to produce $TaI_5$, and the $TaI_5$ would continue reacting with Al to produce Ta, until either all of the $Ta_2O_5$ is consumed, or all of the Al is consumed, depending which is the limiting reagent. As long as the process continues, the vapor space immediately above the $Ta_2O_5$ would reflect the equilibrium vapor concentrations for excess $Ta_2O_5$ (i.e., solid). And as long as the process continues, the vapor space immediately above the Al would reflect the equilibrium vapor concentrations for excess Al (i.e., solid or liquid). The resulting calculated concentrations are shown in Table 1. As indicated above, these concentrations would persist until the limiting reagent, either $Ta_2O_5$ or Al metal, is consumed. Therefore, the exact amount of solid $Ta_2O_5$ and Al depends on how much material it is desired to convert in a given reaction. As noted above, the small amount of iodide used to catalyze vapor transport could be added to this system in the form of $AlI_3$, $TaI_5$, or $I_2$. The exact amount of iodide will depend on the size of the reactor since the volume will affect the partial pressure of the iodide-bearing species.

TABLE I

Calculated Partial Pressures for Vapors in the Immediate Vicinity of the Solid Reactants Until the Limiting Reagent is Consumed (at 600 C.).

| Solid Reactants | Partial Pressure, atm, of Vapor Species (until reaction completion) | | |
|---|---|---|---|
| | $TaI_5$ | $AlI_3$ | Al |
| $Ta_2O_5$ | $6 \times 10^{-5}$ | $2 \times 10^{-10}$ | $1 \times 10^{-28}$ |
| Al | $8 \times 10^{-16}$ | $1 \times 10^{-4}$ | $2 \times 10^{-16}$ |

The previously described versions of the present invention include many advantages, including superior capacitor-grade materials and preparation processes to produce capacitor grade metal material that can be formed into high performance capacitors characterized by high capacitance and low DC leakage. Also, many of the steps used in conventional techniques for producing capacitor-grade valve metal can be omitted. For example, in practicing the process of the present invention, the valve metal product can be isolated from the getter material such that no further step of separating the valve metal from the getter material is required. In addition, as described above, the valve metal prepared according to the present invention can be formed, as part of the process, into any desired form, such as a thin film layer on a substrate.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of an upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A process for producing valve metal, comprising:
   contacting, in a reactor, a starting valve metal oxide and a vapor-phase transport agent to form a gaseous valve metal species; and
   contacting said gaseous valve metal species with at least one solid getter material to form said valve metal, wherein said starting valve metal oxide comprises a tantalum pentoxide or a niobium pentoxide.

2. The process of claim 1, wherein said vapor-phase transport agent comprises one or more halogens, halides, or subhalides, or combinations thereof.

3. A process for producing valve metal, comprising:
   contacting, in a reactor, a starting valve metal oxide and a vapor-phase transport agent to form a gaseous valve metal species; and
   contacting said gaseous valve metal species with at least one solid getter material to form said valve metal, wherein said vapor-phase transport agent comprises iodine.

4. The process of claim 1, wherein said vapor-phase transport agent comprises a halide that includes said solid getter material, or a portion of said solid getter material.

5. The process of claim 1, wherein said vapor-phase transport agent comprises $I_2$, $MgI_2$, $AlI_3$, $TaI_5$, $NbI_5$, or a combination thereof.

6. The process of claim 1, wherein said vapor-phase transport agent is formed in situ.

7. The process of claim 1, wherein said reactor includes substantially no partial pressure of said getter material in the vicinity of the starting valve metal oxide.

8. The process of claim 1, wherein said starting valve metal oxide comprises a tantalum oxide or a niobium oxide, and said gaseous valve metal species comprises $TaI_5$ or $NbI_5$ respectively.

9. The process of claim 3, wherein said starting valve metal oxide comprises a tantalum pentoxide or a niobium pentoxide.

10. The process of claim 1, wherein said solid getter material comprises magnesium or aluminum.

11. The process of claim 1, wherein said starting valve metal oxide comprises a tantalum pentoxide, said vapor-phase transport agent comprises $I_2$, $TaI_5$, $MgI_2$, or a combination thereof, said gaseous valve metal species comprises $TaI_5$, said solid getter material comprises magnesium, and said valve metal comprises tantalum.

12. The process of claim 1, wherein said starting valve metal oxide comprises a niobium pentoxide, said vapor-phase transport agent comprises $I_2$, $MgI_2$, $NbI_5$, or a combination thereof, said gaseous valve metal species comprises $NbI_5$, said solid getter material comprises magnesium, and said valve metal comprises niobium.

13. The process of claim 1, wherein said contacting said starting valve metal oxide with said vapor-phase transport agent also forms a getter material oxide.

14. The process of claim 1, wherein said contacting said starting valve metal oxide with said vapor-phase transport agent also forms MgO or $Al_2O_3$.

15. The process of claim 1, wherein said solid getter material is present in said reactor in an amount that is less than or equal to a stoichiometric amount of said staffing valve metal oxide.

16. The process of claim 1, wherein said starting valve metal oxide being $Ta_2O_5$ and said solid getter material being Mg are present in said reactor in a weight ratio range of from about 1:0.2 to about 1:2.75.

17. The process of claim 16, farther comprising collecting at least a portion of said vapor-phase transport agent in an isolatable trap for re-use.

18. The process of claim 1, wherein said valve metal is transported, in the form of the vapor phase transport agent, from a container housing the starting valve metal oxide to a separate container and deposited as said valve metal.

19. The process of claim 13, further comprising separating said valve metal from said getter material oxide.

20. The process of claim 1, wherein said valve metal has an oxygen content of about 10,000 ppm or less.

21. The process of claim 1, wherein said valve metal comprises a film on a substrate.

22. The process of claim 1, further comprising isolating said valve metal from said getter material after said formation of said valve metal.

* * * * *